United States Patent [19]

Varma et al.

[11] Patent Number: 5,397,645
[45] Date of Patent: Mar. 14, 1995

[54] FIRE RESISTANCE COMPRISING AN EPOXY RESIN AND A BORON COMPOUND

[75] Inventors: Karikath S. Varma, Southport; David P. Parkes, Wrightington, both of United Kingdom

[73] Assignee: Pilkington PLC, United Kingdom

[21] Appl. No.: 836,811

[22] Filed: Feb. 19, 1992

[30] Foreign Application Priority Data

Feb. 19, 1991 [GB] United Kingdom ............ 9103402

[51] Int. Cl.⁶ ........................................ B32B 27/38
[52] U.S. Cl. ............................... 428/413; 252/606; 252/609; 428/415; 428/417; 428/427; 428/921
[58] Field of Search ............... 428/427, 415, 417, 921, 428/413; 106/18.13; 252/606, 609; 528/91; 525/502, 506

[56] References Cited

U.S. PATENT DOCUMENTS

| | | | |
|---|---|---|---|
| 3,324,053 | 6/1967 | Braithwaite | 525/403 |
| 3,380,963 | 4/1968 | Thomas | 525/406 |
| 3,793,105 | 2/1974 | Birchall et al. | 428/432 X |
| 3,989,573 | 11/1976 | Sanjana | 428/417 X |
| 4,071,649 | 1/1978 | Jacquemin et al. | 428/215 |
| 4,230,660 | 10/1980 | Taylor et al. | 523/445 X |
| 4,265,806 | 5/1981 | Grundmann et al. | 524/100 |
| 4,391,924 | 7/1983 | Uram | 521/178 |
| 4,468,504 | 8/1984 | Kuemmel | 525/406 |
| 4,873,309 | 10/1989 | Corley | 528/102 |
| 4,933,421 | 6/1990 | Morehead | 528/91 |
| 5,019,605 | 5/1991 | Jannic | 523/219 |

FOREIGN PATENT DOCUMENTS

| | | |
|---|---|---|
| 2058076 | 4/1981 | European Pat. Off. . |
| 0295496 | 12/1988 | European Pat. Off. . |
| 63-189472 | 8/1988 | Japan . |
| 1575708 | 9/1980 | United Kingdom . |
| 2086909 | 5/1982 | United Kingdom . |
| 2092594 | 8/1982 | United Kingdom . |
| 2099433 | 12/1982 | United Kingdom . |

*Primary Examiner*—D. S. Nakarani
*Assistant Examiner*—H. Thi Le
*Attorney, Agent, or Firm*—Burns, Doane, Swecker & Mathis

[57] ABSTRACT

A reaction mixture for preparation of a fire resistant composition comprising an epoxy resin, a curing agent for said resin and a boron compound which is not a curing agent for the epoxy resin, the reaction mixture being translucent such that the reaction mixture cures to a translucent reaction product. The invention further provides a method of producing a fire resistant laminate in which the cured reaction product of a boron compound containing epoxy resin is used as an interlayer between two translucent panes and to a translucent fire resistant laminate.

10 Claims, 2 Drawing Sheets

FIRE RESISTANCE COMPRISING AN EPOXY RESIN AND A BORON COMPOUND

BACKGROUND TO THE INVENTION

The invention relates to a reaction mixture for preparation of a fire resistant composition comprising an epoxy resin and a curing agent for the resin, and the reaction product of the mixture. The invention further relates to the use of the reaction mixture and the reaction product in improving the fire resistance of a substrate, and in producing a translucent fire resistant laminate.

DESCRIPTION OF THE PRIOR ART

Fire retarding epoxy resin material is known from GB-A-1575708 which discloses the addition of a filler of melamine borate to an epoxy resin material so as to provide fire-retardant properties. The melamine borate contains nitrogen and decomposes when heated to form ammonia which assists fire-resistance by providing flame-extinguishing properties. U.S. Pat. No. 4,468,504 also discloses the use of melamine borate in a flame-inhibiting epoxy resin. It is also known from GB-A-1575708 that a filler of sodium tetraborate and monobasic ammonium phosphate in an amine-cured epoxide polysulphide resin mixture as a binder can give off ammonia on heating and boron trioxide formed in a subsequent reaction forms a heat-reflecting or absorbing layer on the porous carbonised residues. Neither document suggests that the resin could be used to make translucent laminates. This is because none of the disclosed resin materials would themselves be translucent. Both of these borate compounds are inorganic salts which are opaque and thus cannot be used to produce translucent laminates. In addition, the prior art boron compounds, being inorganic salts, are required to be ground with the epoxy resin so as to form a fine, but two phase, admixture of the inorganic salt and the epoxy resin. The resultant cured resin would not be useful to produce translucent laminates.

GB-A-2104838 discloses fire screening glazing panels in which layers of intumescent material are sandwiched between sheets of vitreous material. The preferred intumescent materials are hydrated alkali metal salts. The intumescent layers do not comprise epoxy resin adhesives.

EP-A-0295496 discloses a char forming intumescent composition comprising an epoxy resin and a curing agent therefor and an additive component which comprises a mixture of materials adapted to provide a source of each of phosphorous, zinc, boron and expansion gas upon thermal decomposition. The composition is used in the protection of heat sensitive substrates such as plastics, fibreglass reinforced resins and low melting point metals, and in particular in the coating of PVC coated cables. There is no disclosure of compositions which are translucent and there is no disclosure of the manufacture of translucent fire resistant laminates. A wide variety of boron compounds is disclosed including inorganic and organic boron compounds. The use of borate esters such as butyl borates or phenyl borates is disclosed. However, such boroesters have the disadvantage that they are flammable and have a high vapor pressure such that they can volatilise on being subjected to heat, this causing the boron in the composition to be volatilised off when the composition is subjected to a fire and thus reducing the fire-resistance. In addition, the phenyl borate could act as a curing agent, or at least a co-curing agent, for epoxy resins since it would have a degree of Lewis acidity and would not be sterically hindered.

Epoxy resin reaction mixtures and reaction products, and their use in translucent laminates, for example as windows for military helicopters, have been proposed previously. For example, GB-B-2058076 relates to such a reaction mixture comprising a "transparent blend obtained from" an epoxy resin, trimethoxyboroxine and a phenyl substituted alkyl alcohol, especially benzyl alcohol. The trimethoxyboroxine is used as a curing agent for the epoxy resin which may be of the bisphenol-A type, the bisphenol-F type or the novolac type. The phenyl substituted alkyl alcohol is used as a retarder and an inhibitor for the trimethoxyboroxine-epoxy reaction, enabling a high proportion of trimethoxyboroxine to be used without causing foaming (the epoxy-trimethoxyboroxine reaction is exothermic) and providing a sufficiently slow cure to enable large sheets of the composition to be cast and cured. The patent further proposes incorporation of organic phosphorus compounds, especially selected organic phosphates, in the reaction mixture to improve its fire resistance. It further proposes the use of the reaction product as an interlayer between "transparent materials" including acrylics, polycarbonates and silicate glass outer plies, and also refers to the possibility of using a binder layer, which may be a silicone, a urethane or an epoxy between the interlayer and an outer ply. The resultant laminated "transparencies" are said to have a variety of possible applications including use in military hardware and aircraft, as well as spacecraft. Other applications are said to include protection against the thermal effects of fossil fuel fires, thermal nuclear blasts and high energy radiation.

UK patent GB 2 099 433B extends the disclosure of GB 2 058 076B to include other boroxines in which the three methyl groups of trimethoxyboroxine are replaced by other monovalent radicals having from 2 to 18 carbon atoms. UK patent GB 2 086 909 relates to the use of certain moisture resistant mercaptan interlayers as binding layers to bond an interlayer comprising the fire resistant reaction product of an epoxy resin, a trialkoxyboroxine and a phenyl substituted alkyl alcohol to outer plies. UK patent GB 2 092 594B relates to the incorporation of certain organic phosphates and related compounds in the epoxy based reaction mixtures referred to above to improve the fire resistance of the reaction products.

Extensive studies by the applicants on the fire resistance of the reaction products of the reaction mixtures referred to above have shown that, on exposure to fire, they burn to form a dark "char", and that the fire resistance of the char and its ability to bond, when present as an interlayer, to outer glass plies, is related to the boron content of the reaction product. It is thought, and there is experimental evidence to support the supposition, that this may be because the boron forms inorganic borates which combine at high temperature to form glassy polyborates which impregnate the residual char to impart good mechanical stability, inhibit oxidative degradation of the char and improve the adhesion between the impregnated char and the surface of the glass.

However, whatever the mechanism (and the applicants do not wish to be bound to any particular theory to account for the improved performance of their high boron compositions), the applicants have found that the fire resistance of the reaction products of the epoxy resin-curing agent products may be improved by including an additional boron compound which is not a curing agent for the epoxy resin in the reaction mixture.

SUMMARY OF THE INVENTION

The present invention provides a reaction mixture for preparation of a fire resistant composition comprising an epoxy resin, a curing agent for said resin and a boron compound which is not a curing agent for the epoxy resin, the reaction mixture being translucent such that the reaction mixture cures to a translucent reaction product.

Preferred translucent reaction mixtures and translucent reaction products in accordance with the invention have a light transmission, through a 2 mm layer thereof, of at least 10%, more preferably at least 20%.

Preferably, the boron compound which is not a curing agent for the epoxy resin is an organoboron compound. In this specification the term "organoboron compound" is intended to mean a compound which contains boron, is soluble in organic solvents and is therefore soluble in or miscible with the epoxy resin so that the reaction mixture can be a single phase mixture. The organoboron compound may be a sterically hindered boroester or a sterically hindered boric anhydride, the steric hindrance preventing it from functioning as a curing agent for the epoxy resin. In this specification the term "boroester" is intended to mean substituted or unsubstituted boric acid esters including boric acid diesters of alkane diols.

The present invention also provides a method of producing a translucent fire resistant laminate comprising the steps of: providing a reaction mixture comprising an epoxy resin, a curing agent for said resin and a boron compound which is not a curing agent for the epoxy resin; and curing the reaction mixture to form a translucent reaction product which forms an interlayer between two translucent panes.

The present invention further provides a translucent fire-resistant laminate including two translucent panes bonded to a translucent interlayer, said interlayer being the reaction product of a reaction mixture comprising an epoxy resin, a curing agent for said resin and a boron compound which is not a curing agent for the epoxy resin.

The present invention still further provides a method of improving the fire resistance of a substrate comprising applying a reaction mixture in accordance with the invention to said substrate and curing the reaction mixture on said substrate to form a fire resistant layer adhering to the substrate.

The present invention also provides a reaction mixture for preparation of a fire resistant composition comprising an epoxy resin, a curing agent for said resin, and an organoboron compound which is not a curing agent for the epoxy resin, the organoboron compound selected from at least one of a boroester and a boron anhydride, each having a plurality of borate groups.

The epoxy resin may be epoxidised Bisphenol-A or Bisphenol-F resin or an epoxidised resin of the novolac type, and should be translucent when a translucent product is required as the interlayer of a fire-resistant laminate to be sued as a window. Blends or mixtures of these epoxy resins may be used in accordance with the invention.

The curing agent may be a Lewis acid (or base) capable or reacting with the epoxide groups in the epoxy resin; it may be mono, di or polyfunctional in its reactivity. It is preferred to select a curing agent which is colourless and, if the reaction mixture is to be used to form an interlayer for use between outer glass plies, a curing agent which has a refractive index close to that of glass. Boron compounds which are Lewis acids may be used provided they are not sterically hindered. Examples of suitable boron containing curing agents include sterically unhindered organoboron esters, for example tricresyl borates and boroxines. The boroxines of the formula

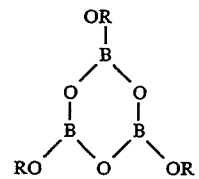

wherein each R independently is a radical containing 1 to 18 carbon atoms, especially an alkyl group, which may be substituted or unsubstituted, containing 1 to 18 carbon atoms are generally preferred and, of these, it is generally most convenient to use those in which R is an optionally substituted alkyl group containing up to 6 carbon atoms. Trimethoxyboroxine or triethoxyboroxine are usually used since these are liquid at room temperature while the higher trialkoxyboroxines are solid and their use requires a solvent.

An example of a suitable sterically unhindered boric acid ester is BOROESTER 8 (tri-m, p-cresyl borate, a pale yellow liquid containing 3.3% by weight of boron).

As an alternative to a boron containing curing agent, a basic curing agent, for example an aliphatic or aromatic amine, may be used. Examples of suitable amines are tris(dimethylamine) phenol and the amines available in commerce from Anchor Chemical (UK) Ltd of Manchester, England, under the designations ANCAMINE 1618 (a cycloaliphatic amine), ANCAMINE 1608 (an aliphatic amine), ANCAMINE 1769 (a hydroxylated polyamine), ANACAMINE 1784 (an aliphatic amine), ANCAMINE 1561 (described as an "accelerated cycloaliphatic amine"), ANCAMINE 1618-F (a modified cycloaliphatic amine), ANCAMINE 1934 (a cycloaliphatic amine), ANCAMINE 2074 (a cycloaliphatic amine) and ANCAMINE BDMA (benzyldimethylamine) and AMINE T (2-hydroxyethyl diethylene triamine).

Other curing agents may be used, for example, organoboron-amine complexes such as a boron trifluoride: amine adducts, for example, that available from Aldrich Chemical Company of Gillingham, Dorset, England as BF₃-400. However, such curing agents are generally useful only for laminates of relatively small area since the curing reaction can be too exothermic.

The boron compound which is not a curing agent for the epoxy resin may be a sterically hindered boroester or a sterically hindered boric anhydride, the steric hindrance preventing it from functioning as a curing agent for the epoxy resin.

The boron compound which is not a curing agent for the epoxy resin will generally be a compound which is not effective as a Lewis acid and does not react with the epoxy groups of the resin. However, it will be appreciated that boron compounds may be used which react only slowly with the epoxy resin so that, when the curing agent is present, it reacts preferentially with the epoxy resin so that there is little or no reaction between the boron compound which is not a curing agent and the epoxy resin.

The preferred boroesters used in accordance with the present invention have a greater proportion of boron, and thus a greater number of BO bonds, than the butyl and phenyl borates disclosed in the prior art. Typically, the boroesters are polyborates, e. g. biborates, and the boric anhydride is bifunctional with respect to borate. This not only reduces the volatility of the boron content in the boron compound thereby enhancing the glass forming effect, and thus the fire resistance, when the composition is subjected to a fire but also tends to enhance the degree of glass forming due to the increased BO bonding in the composition. We have found that the preferred boroesters in accordance with the invention, which are biborates, have broad decomposition profiles when heated i.e. they tend to decompose over broad temperature ranges, and also at high temperatures. This enhances the glass forming effect and gives greater fire retardance. Such decomposition profiles can readily be determined by thermogravimetric analysis. This can be contrasted to the decomposition profiles of monoborate additives, such as butyl or phenyl borate, which have very narrow decomposition profiles showing that the borate tends substantially completely to decompose or volatalise in a narrow temperature range with a consequently reduced tendency to form borate gases. Preferably, the organoboron compound comprises at least 5 wt % boron, usually from 5 to 20 wt % boron, more preferably from 5 to 8 cwt % boron. A relatively high boron concentration is preferred since this enhances the glass forming effect on heating and reduces the total amount of boron compound which is added to the reaction composition.

Examples of suitable boroesters are the trialkyl boroesters of formula $B(OR)_3$, where R is a radical containing 1 to 18, preferably 1 to 8 carbon atoms, especially those which are colourless liquids. Preferred boroesters of this formula are those in which R is a secondary or tertiary alkyl group or an aryl group containing 6 to 18 carbon atoms. One such preferred boroester is BORESTER 5(tri-n-octyl borate, a colourless liquid containing 2.7% by weight boron).

Other preferred boroesters, are those derived from a diol and boric acid which tend to have a high boron content combined with a high degree of steric hindrance. Especially preferred boroesters are trialkylene biborates wherein the alkylene group contains 2 to 8 carbon atoms, for example, BORESTER 35 tri-(1,3-butanediol) biborate, a colourless to pale yellow liquid containing 7.1% by weight of boron. BORESTER 7, tri-(2-methyl-2,4-pentanediol) biborate, a colourless liquid containing 5.9% by weight of boron, and BORESTER 15, tri octylene glycol diborate, a liquid containing 4.76 wt % of boron.

An example of a suitable sterically hindered boric anhydride is BORESTER 33, hexylene glycol boric anhydride, a colourless to pale yellow liquid containing 7.5% by weight of boron. BORESTER is a trade mark and the BORESTER compounds referred to herein are available in commerce from US Borax Inc of Anaheim, Calif.

Other boroesters which could be employed in the present invention are unsaturated borates, such as BORESTER 22, triallyl borate ($C_9H_{15}O_3B$, boron content 5.94 wt %); amino boroesters, such as BORESTER 20, triethanolamine borate ($C_5H_{12}O_3NB$, boron content 6.89 wt %), BORESTER 21+, tri-iso-propanolamine borate ($C_9H_{12}O_3NB$, boron content 5.44 wt %) and BORESTER 110,2-(B-dimethylamino ethoxy)-4-methyl-1,3,2 dioxaboriname, ($C_8H_{18}BNO_3$, boron content 5.8 wt %); and polyborate esters, such as methyl polyborate $[(CH_3O)_3B]_2(B_2O_3)_x$ where $x=2-3$, boron content not less than 20 wt %. The amino boroesters would be used particularly with amine curing agents for the epoxy resin.

The reaction mixture preferably contains up to 50 parts by weight of organoboron compound which is not a curing agent for the epoxy resin per 100 parts by weight of epoxy resin, more preferably from 4 to 20 parts by weight of organoboron compound which is not a curing agent for the epoxy resin per 100 parts by weight of epoxy resin.

The proportion of curing agent to base resin used will depend on the particular curing agent used, its reactivity and molecular weight and whether any cure "moderator", such as a phenyl substituted alkyl alcohol is used, as described in UK patent GB 2 058 076B, to control the rate of cure achieved with a trimethoxyboroxine curing agent. In general, the curing agent will be used in an amount of 4 to 70 parts by weight of curing agent per 100 parts by weight of epoxy resin. When a boron containing curing agent is used, such as trimethoxyboroxine, an amount in the preferred range of 4 to 20 parts by weight (more preferably 8 to 12 parts by weight) per 100 parts by weight of epoxy resin will usually be used. When an amine curing agent is used, an amount in the preferred range of 14 to 70 parts by weight per 100 parts parts by weight of epoxy resin will generally be appropriate.

If a phenyl substituted alkyl alcohol such as benzyl alcohol is used to control the rate of cure, it may be used in an amount of 1 to 10 parts by weight per 100 parts by weight of epoxy resin.

Other components which may be incorporated in the fire retardant reaction mixtures of the present invention include phosphates and phosphites, such as those proposed in UK patents GB 2 092 594B and GB 2 058 076B, and also halogenated, usually chlorinated, organic compounds, useful for their flame retardant properties.

Examples of suitable phosphates include tris-2-chloroethyl phosphate (TCEP), tris(dichloroisopropyl) phosphate (TDCP), tris(monochloroisopropyl) phosphate, tributoxyethyl phosphate, trioctyl phosphate, diphenyl chlorophosphate (available in commerce from Aldrich Chemical Company of Gillingham, Dorset, England), chlorinated diphosphate esters (available in commerce from Albright & Wilson Ltd of Warley, West Midlands, England as AMGARD V6 and AMGARD V7), and high molecular weight polyphosphates such as those available from Albright & Wilson as AMGARD V19 and ANTIBLAZE 19. Phosphonates e.g. Albright & Wilson's AMGARD DMMP, dimethyl methyl phosphonate, may also be used.

Examples of suitable phosphites include tris-2-chloroethyl phosphite (TCEPi), diphenyl phosphite, and dibutyl phosphite.

Examples of suitable halogenated compounds include, in addition to the chlorinated phosphates referred to above, liquid chloroparaffins, such as that available from Hoechst Chemicals as HOECHST 40 LV.

While, in some cases, the reaction mixtures of the present invention may be cured without application of external heat, in order to achieve a complete cure it is generally desirable to apply external heat.

When the reaction mixture is to be used to improve the fire resistance of a substrate, it will normally be applied to the substrate in liquid form e.g. by spraying, and cured in situ on the substrate. When the components used are highly reactive, it may be desirable to mix them only shortly before application e.g. by using a spray gun with a head in which the components are mixed immediately before being directed in spray form on to the substrate.

Reactive diluents, such as phenyl glycidyl ether (PGE) and butyl glycidyl ether (BGE) may be employed in the resin composition to lower the viscosity of the liquid resin and reduce the chain length of the epoxy monomers.

When the reaction mixture is to be used in the production of a translucent laminate, it may be "cast" in a casting cell comprising two opposed outer plies, e.g. of glass or plastics spaced apart and separated from one another by a peripheral spacer between them, and cured in the cell. Such techniques are well known and are described in, for example, GB-A-2015427 and GB-A-2032844, and in EP-A-0200394. The glass plies may be of annealed or toughened (heat or chemically toughened) glass and the plastics plies may be of acrylic or polycarbonate plastics material. In the manufacture of such "cast-in-place" interlayers of laminates, preferably the liquid reaction mixture has a viscosity of from 50 to 4500 centipoise at a temperature of 25° C. more preferably a viscosity of from 300 to 2000 centipoise at a temperature of 25° C. A typical final viscosity of a reaction mixture in accordance with the invention is 1000 centipoise at 25° C.

The reaction mixture may be cast between outer plies required in the final laminate, or between outer plies coated on their internal faces with a release agent. In the latter case, the cured layer of reaction mixture may be removed by dismantling the casting cell and separating it from the outer plies, and either used as a free standing slab or with an appropriate binder layer or layers to bind it to one or more facing translucent plies to form the required fire resistant laminate. The term "translucent" is used herein to describe products and materials which transmit light so that they are suitable for glazing applications, whether providing clear through vision, i.e. being transparent or colourless, or not.

According to a further aspect of the invention there is provided a composition for production of the reaction mixture of the invention by mixing with a curing agent, said composition comprising an epoxy resin and an organoboron compound which is not a curing agent for the reaction mixture.

BRIEF DESCRIPTION OF THE DRAWINGS

Embodiments of the present invention will now be described by way of example only with reference to the accompanying drawings, in which.

DETAILED DESCRIPTION OF THE PREFERRED EMBODIMENTS

Figure 1:
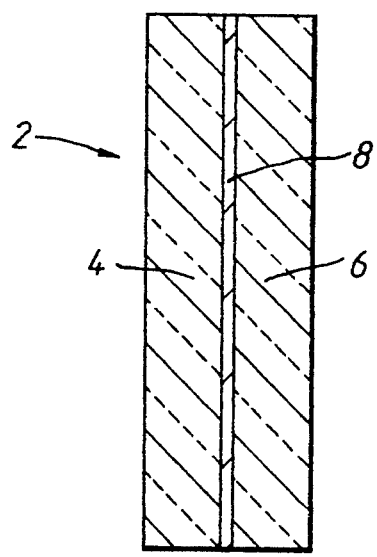
FIG. 1 is a schematic section through a glass laminate in accordance with a first embodiment of the present invention.

The invention is illustrated but not limited by the following Examples, in which translucent laminates in accordance with the invention are prepared and tested for fire resistance using one or more of the following tests, which are of generally increasing stringency: A. The laminate was exposed to a torch flame at about 1200° C. It was deemed to have passed the test if there was no flame penetration beyond the non exposed face after 10 minutes. B. A sample of the laminate measuring 31 cm × 21 cm in plan was mounted in a steel frame and heated using an electric furnace in accordance with BS 476: Parts 20 and 22 : 1987, and the non exposed face of the specimen monitored during the 30 minutes heating period. It was deemed to have passed the test if the stability and integrity of the unexposed face, determined in accordance with BS 476, was maintained for 30 minutes C. As test B, but using a pressurised gas fired furnace to test a sample measuring 86 cm × 86 cm in plan in a wooden frame. D. As test B, but using a pressurised oil fired furnace to test a sample measuring 86 cm × 86 cm in plan in a metal frame. E. As test B, but using a BSI certified testing facility to test a sample measuring 90 cm × 110 cm in plan. In the preparation of reaction mixtures in the Examples, all parts and percentages are by weight unless otherwise stated.

Example 1

71.1 parts of SHELL EPIKOTE 862 Bisphenol F epoxy resin was placed in a reaction flask and the following components added: 1.3 parts benzyl alcohol 0.84 parts δ-glycidoxypropyl trimethoxysilane (known as A-187).

TABLE 1

| Example | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|
| Bisphenol A epoxy resin | | | | | | | | | | | | | — | — | 48.8 | 47.1 |
| Bisphenyl F epoxy resin | 67.7 | 65.1 | 69.5 | 71.1 | 70.0 | 71.1 | 71.1 | 71.1 | 71.1 | 71.1 | 71.1 | 72.1 | 70 | — | — |
| Curing agent | | | | | | | | | | | | | | | |
| Trimethoxyboroxine | 8.0 | 7.7 | 8.2 | 8.4 | 8.3 | 8.4 | 8.4 | 8.4 | 8.4 | 8.4 | 8.4 | 6.0 | — | — | — |
| Ancamine 1618 | | | | | | | | | | | | | — | 34.15 | 33 |
| Tris(Dimethylamine)-phenol | | | | | | | | | | | | | — | 10 | — | — |
| Benzyl alcohol | 1.2 | 1.1 | 1.0 | 1.3 | 1.0 | 1.3 | 1.3 | 1.3 | 1.3 | 1.3 | 1.3 | 1.0 | — | — | — |
| Additional boron compound | | | | | | | | | | | | | | | |
| BORESTER 7* | 8.0 | 7.6 | 3.2 | 3.3 | 3.2 | 3.3 | 3.3 | 3.3 | — | — | — | — | — | — | — |
| BORESTER 33* | — | — | — | — | — | — | — | — | 3.3 | 3.3 | — | 5.0 | 4.5 | 4.87 | 9.4 |

TABLE 1-continued

| Example | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|
| BORESTER 35* | — | — | — | — | — | — | — | — | — | — | 3.3 | — | — | — | — |
| γ-glycidoxypropyl trimethoxysilane | 0.8 | 0.8 | 0.8 | 0.8 | 0.8 | 0.8 | 0.8 | 0.8 | 0.8 | 0.8 | 0.8 | 0.8 | 0.5 | 2.43 | 0.5 |
| Tris(2-chloroethyl) phosphate | — | — | 14.5 | — | 14.3 | — | 11.7 | — | — | 15 | 15.1 | 15.1 | 15 | 0 | 10 |
| Chlorophosphate | — | — | — | 15.1 | — | — | — | — | — | — | — | — | — | 9.75 | — |
| Chloroparaffin | — | — | — | — | — | — | 3.3 | 15.1 | — | — | — | — | — | — | — |
| TCEPi | 14.3 | 13.8 | — | — | — | — | — | — | — | — | — | — | — | — | — |
| TDCP | — | — | — | — | — | 15.1 | — | — | 15.1 | — | — | — | — | — | — |
| PGE | — | 3.8 | 2.5 | — | — | — | — | — | — | — | — | — | — | — | — |
| BGE | — | — | — | 2.3 | — | — | — | — | — | — | — | — | — | — | — |
| Performance | a,b,c | a,b,c | a,b,c | a,b,c | a,b,c | a,b,c | a,b,c | a,b,c,d | a,b,c,d | a,b,c,d | a,b,c,d,e | a,b | a | a,b | a,b |

*Chemical name set out in specification 15.1 parts tris (2-chloroethyl) phosphate (TCEP from Albright & Wilson) 3.3 parts (2-methyl-2,4 pentanediol) biborate (BORESTER 7)

The mixture in the flask was warmed at between 20° C. and 25° C. while stirring and degassing using a standard one stage vacuum pump to remove any entrapped air and volatiles.

Degassing was discontinued and 8.4 parts of trimethoxyboroxine was added, as curing agent, to the above mixture with stirring. Degassing was recommenced and, after 15 minutes, stirring was stopped. Degassing was continued for a further 15 minutes without stirring.

A laminate cell was made up comprising two similar panes of 3 mm float glass assembled in opposed facing relationship, spaced 1.8 mm apart by a 1.8 mm wide adhesive butyl tape between the panes around the peripheral margins of the panes which were pneumatically clamped together. The tape was not continuous but a small gap, approximately 10 cm in length, was left on one side for introduction of the interlayer material.

The reaction mixture described above was poured into the laminate cell held vertical to completely fill the cell when it was subsequently turned horizontal with the thickness determined by the thickness of the butyl tape. A strip of adhesive butyl tape was inserted to fill the gap that had been left and the filled cell placed horizontal in an oven and cured above 100° C. for several hours. The resulting laminate, comprising two panes of clear float glass bonded to an interlayer derived from the epoxy resin based reaction mixture, was substantially transparent. Samples of laminate prepared in this way were subjected to fire tests described at A, B, C, D and E above and passed in each case.

In a comparative Example, the above procedure was repeated omitting the biborate, i.e. the boron compound which is not a curing agent for the epoxy resin, and using, in its place, 3.3 parts of diphenylphosphite (a known fire retardant). Despite the use of the diphenyl phosphite, the laminates prepared passed only tests A and B and failed test C.

Examples 2 to 16

The procedure described in Example 1 was repeated using the reaction mixtures shown in Table 1, and subjecting each of the resulting laminates to the tests indicated in the Table in order of increasing severity, i.e. A, B, C, D and then E. Examples 2 to 13 used trimethoxyboroxine as curing agent and Examples 14 to 16 used amine curing agents. Any suitable amine curing agents may be employed but the examples specifically used ANCAMINE 1618 and Tris(Dimethylamine)phenol. Examples 15 and 16 used Bisphenol A epoxy resin rather than Bisphenol F epoxy resin for the remaining examples and the results show that these two epoxy resins are interchangeable. In fact, mixtures of these resins may be used. In each case, the laminates passed the last test indicated but either (a) failed the next more severe test or (b) were adjudged from their performance in the last test to be incapable of passing the next most severe test (except that, tests C and D being of similar severity, laminates passing test C, but being adjudged incapable of passing test E, were not-in the interests of economy-necessarily subject to test D).

Example 17

Example 1 was repeated except that, prior to making up the casting cell, the inner faces of the glass panes (except around the marginal periphery to which the butyl tape adhered) were coated with CIL RELEASE AGENT, a commercially available release agent. After curing in the oven, the butyl tape was cut away and the cured almost transparent interlayer separated from the glass plies. This interlayer was then available, for use either as a free standing sheet, or with suitable binding layers, for the production of fire resistant laminates. The free standing sheet was tested in accordance with Test A above (only), and passed.

Referring now to the drawings, FIG. 1 shows a glass laminate in accordance with the first embodiment of the present invention. The glass laminate 2 comprises a pair of opposed glass sheets 4,6 separated by and bonded together by an interlayer 8. The interlayer 8 is composed of a cured fire-resistant resin composition in accordance with the present invention and as disclosed hereinabove which has been cast-in-place between the two glass sheets 4,6 and has been cured in situ therebetween. The interlayer 8 has a thickness of 1.8 mm and the glass sheets 4,6 are sheets of annealed glass having a thickness of 3 mm each. The glass laminate shown in FIG. 1 has good fire resistance. Examples of the laminate of FIG. 1 were fire tested and had an integrity of greater than 30 minutes. The laminate has the advantages over known fire resistant laminates that it is cuttable, being made of annealed glass, and is only 7.8 mm thick which not only reduces the thickness of the laminate compared with known laminates but also substantially reduces the cost of the laminate.

Figure 2:
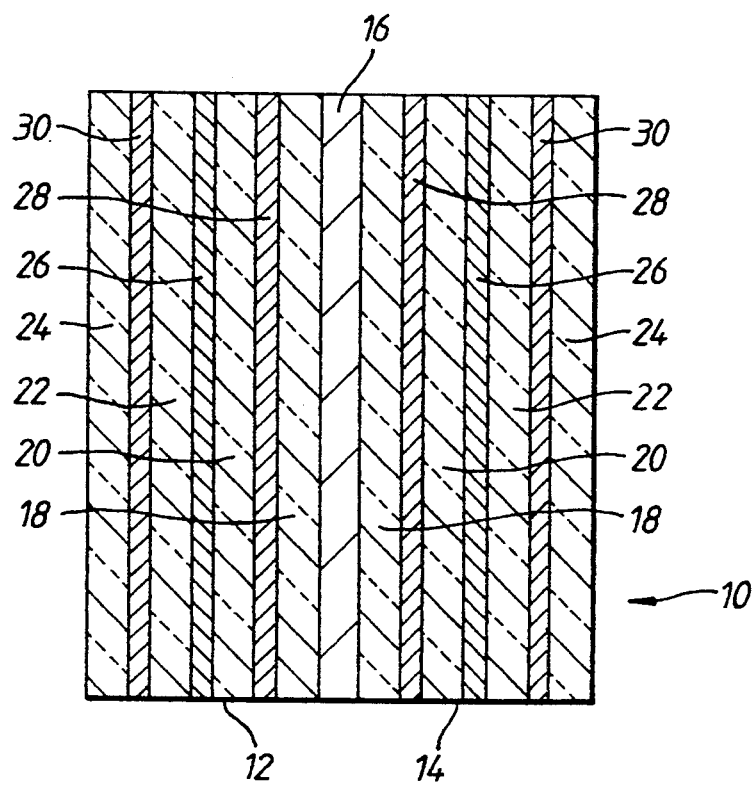
FIG. 2 is a schematic section through a glass laminate in accordance with a second embodiment of the present invention.

FIG. 2 shows a laminate in accordance with the second embodiment of the present invention. The glass laminate 10 comprises two multi-laminar pieces 12,14 in opposed relation and separated by and bonded together by a 2 mm interlayer 16 of a cast-in-place cured fire-resistant epoxy resin in accordance with the present invention. Each multi-laminar piece 12,14 comprises four panes of 2.8 mm annealed glass 18,20,22,24. The two middle panes 20,22 of each multi-laminar piece 12,14 are separated by a 0.8 or 1.0 mm layer of aluminium phosphate 26. In each multi-laminar piece the inner and outer glass panes 18,24 are separated from a respective adjacent middle pane 20,22 by respective layers 28,30 of intumescent material, such as sodium silicate, each layer 28,30 being 1.4 mm thick. The whole glass laminate 10 has a thickness of around 32 mm, high impact resistance and high fire resistance. The laminate provides the advantage over known laminates in being less thick and therefore less expensive and usable in a greater variety of architectural applications.

Figure 3:
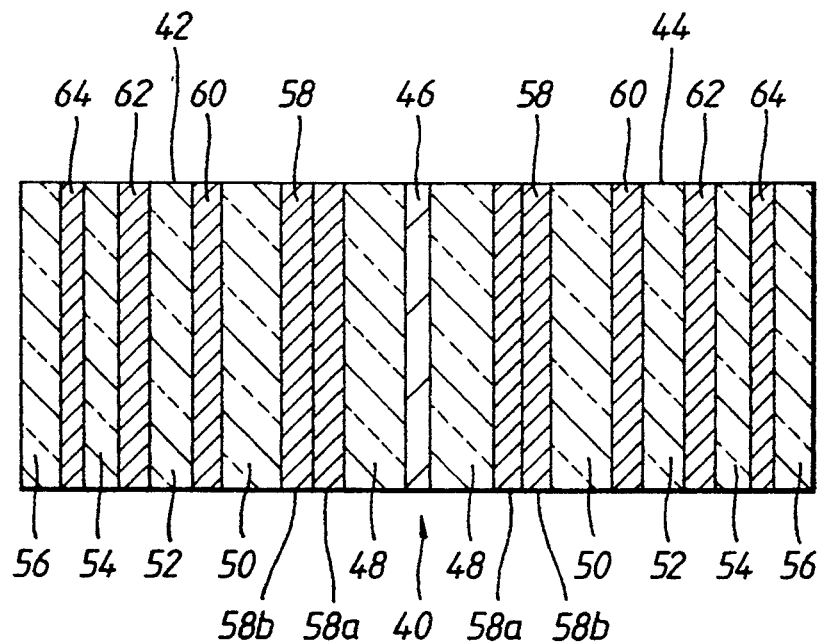
FIG. 3 is a schematic section through a glass laminate in accordance with a third embodiment of the present invention.

FIG. 3 shows a glass laminate in accordance with a third embodiment of the present invention. The laminate 40 comprises two multi-laminar pieces 42,44 separated by and bonded together by a 2 mm thick interlayer 46 of fire-resistant cured epoxy resin in accordance with the present invention. The interlayer 46 has been cast-in-place between the multi-laminer pieces 42,44. Each multi-laminar piece 42,44 consists of five layers 48,50,52,54,56 of 2.8 mm annealed glass, with each layer 48,50,52,54,56 being spaced from the adjacent layer by a respective layer 58,60,62,64 of sodium silicate forming an intumescent layer. The innermost layer 58 of sodium silicate of each multi-laminar piece 42,44 consists of two adjacent layers 58a,58b, each 1.4 mm thick. The remaining layers 60,62,64 of sodium silicate are each 1.4 mm thick. The laminate again has a high fire and impact resistance.

The embodiments illustrated may be modified by the substitution of annealed glass by one or more pieces of thermally or chemically toughened glass. When this is done, then the impact resistance of the laminate is improved. The selection of the materials for the laminates is dependent upon the required fire-resistance and toughness characteristics of the laminate.

In a further embodiment of the present invention, the laminate illustrated in FIG. 1 may be modified by the replacement of one of the annealed glass panes by a toughened pane 8 to 10 mm thick; such a product is preferably used with the toughened glass away from the expected seat of the fire. The embodiment of FIG. 1 may be further modified by the replacement by the two 3 mm thick annealed glass panes by two 3 mm thick panes of acrylic plastics material.

Figure 4:
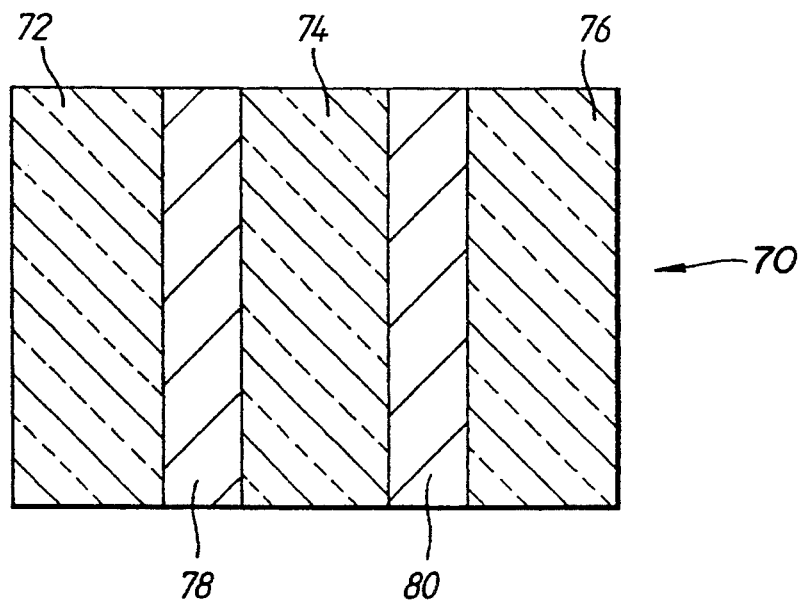
FIG. 4 is a schematic section through a glass laminate in accordance with a fourth embodiment of the present invention.

FIG. 4 shows a glass laminate in accordance with a fourth embodiment of the present invention. The laminate 70 comprises three sheets 72,74,76 of 2 mm thick anneal glass with the outer glass sheet 72,76 being separated from and bonded to the central glass sheet 74 by respective proposed interlayers 78,80 of the fire-resistant epoxy resin in accordance with the present invention. The interlayers 78, 80 are each 1 mm thick so that the combined laminate has a thickness of about 8 mm. Such a laminate is particularly useful for fire resistant glazing of large areas since the use of a multilayer lamiante provides good structural integrity.

What We Claim Is:

1. A translucent fire-resistant laminate including two translucent panes bonded to a translucent interlayer, said interlayer being the reaction product of a reaction mixture comprising an epoxy resin, a curing agent for said resin and an organoboron compound which does not function as a curing agent for the epoxy resin.

2. A laminate as claimed in claim 1 wherein the organoboron compound is a sterically hindered boroester having a plurality of borate groups.

3. A laminate as claimed in claim 1 wherein the organoboron compound is a sterically hindered boron anhydride of formula

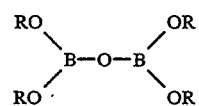

wherein each R is a radical containing 2 to 8 carbon atoms; wherein the R groups may be the same or different radicals; and with the proviso that the Rs may together form, with the —O—B—O— sequence from which they depend, a heterocyclic ring.

4. A laminate according to claim 1 wherein the laminate comprises two panes of annealed glass bonded together by the interlayer.

5. A laminate according to claim 4 wherein the two panes are each of annealed glass about 3 mm thick and the interlayer is about 2.8 mm thick.

6. A laminate according to claim 1 wherein the laminate comprises two multi-laminar pieces bonded together by the interlayer.

7. A laminate according to claim 6 wherein each multi-laminar piece comprises at least four panes of annealed glass separated by respective layers of intumescent material.

8. A laminate according to claim 7 wherein each multi-laminar piece comprises four panes of annealed glass each about 2.8 mm thick and three layers of intumescent material each about 1.4 mm thick.

9. A laminate according to claim 7 wherein each multi-laminar piece comprises four panes of annealed glass each about 2.8 mm thick, three outer layers of intumescent material each about 1.4 mm thick and an inner layer of intumescent material about 2.8 mm thick.

10. A laminate according to claim 7 where the intumescent material is sodium silicate or aluminum phosphate.

* * * * *